United States Patent
Jo et al.

(10) Patent No.: US 9,134,011 B2
(45) Date of Patent: Sep. 15, 2015

(54) APPARATUS FOR PLANAR LIGHTING (71) Applicant: LG ELECTRONICS INC., Seoul (KR)

(72) Inventors: Kyoungwoo Jo, Seoul (KR); Misook Kim, Seoul (KR); Chilkeun Park, Seoul (KR); Sangcheon Kim, Seoul (KR); Boyeon Sim, Seoul (KR)

(73) Assignee: LG Electronics Inc., Seoul (KR)

( * ) Notice: Subject to any disclaimer, the term of this patent is extended or adjusted under 35 U.S.C. 154(b) by 120 days.

(21) Appl. No.: 14/108,913

(22) Filed: Dec. 17, 2013

(65) Prior Publication Data
US 2014/0204575 A1 Jul. 24, 2014

(30) Foreign Application Priority Data

Jan. 23, 2013 (KR) .................. 10-2013-0007295

(51) Int. Cl.
*F21V 1/00* (2006.01)
*F21V 13/10* (2006.01)
*G02F 1/1335* (2006.01)

(52) U.S. Cl.
CPC .......... *F21V 13/10* (2013.01); *G02F 1/133555* (2013.01); *G02F 1/133605* (2013.01); *G02F 1/133606* (2013.01); *G02F 1/133611* (2013.01); *G02F 2203/09* (2013.01)

(58) Field of Classification Search
CPC .............................. G02F 1/1336; G02F 1/1339

USPC ................................................. 362/97.1, 97.3
See application file for complete search history.

(56) References Cited

U.S. PATENT DOCUMENTS

| 8,651,694 | B2 * | 2/2014 | Becker et al. | 362/242 |
| 8,876,320 | B2 * | 11/2014 | Ying | 362/97.3 |
| 8,941,796 | B2 * | 1/2015 | Yokota | 349/61 |
| 2002/0025122 | A1 * | 2/2002 | Ouchi et al. | 385/88 |

FOREIGN PATENT DOCUMENTS

EP  2 541 290 A2  1/2013

* cited by examiner

*Primary Examiner* — Ali Alavi
(74) *Attorney, Agent, or Firm* — Birch, Stewart, Kolasch & Birch, LLP (57) ABSTRACT

An apparatus for planar lighting configurable with light emitting devices is disclosed. The apparatus for planar lighting includes a plurality of light sources arranged on a circuit board; a reflective layer disposed on the circuit board; a transmission regulation layer disposed on the reflective layer and provided with a hole pattern allowing light to be transmitted therethrough, wherein a size of the hole disposed proximate to the light source is smaller than a size of the hole disposed between adjacent two light sources; a spacer disposed between the reflective layer and the transmission regulation layer such that the spacer maintains a distance between the reflective layer and the transmission regulation layer, wherein the spacer comprises at least one protrusion formed by bending a plate member; and an optical sheet disposed on the transmission regulation layer.

20 Claims, 15 Drawing Sheets

APPARATUS FOR PLANAR LIGHTING

This application claims the benefit of the Korean Patent Application No. 10-2013-0007295, filed on Jan. 23, 2013, which is hereby incorporated by reference as if fully set forth herein.

BACKGROUND OF THE INVENTION

1. Field of the Invention

The present invention relates to an apparatus for planar lighting, and more particularly, to an apparatus for planar lighting that may be configured using light emitting devices.

2. Discussion of the Related Art

Among displays, a liquid crystal display (LCD) is used in a wide range of applications including televisions, laptop computers, desktop computer monitors, and mobile phones.

Since LCDs are not self-emissive, a light emitting apparatus to illuminate the liquid crystal panel is needed to display image information.

Since the light emitting apparatus of an LCD is coupled to the rear surface of the liquid crystal panel, it is often called a backlight unit. The backlight unit is an apparatus that forms a uniform surface light source and supplies the same to the backlight unit.

A light emitting diode (LED) is structured by stacking an n-type semiconductor layer, a light emitting layer, and a p-type semiconductor layer on a substrate and forming electrodes on the p-type and n-type semiconductor layers. The LED emits light when recombination of electrons and holes supplied from semiconductor layers occurs in the light emitting layer and thereby light is produced and emitted outside.

LEDs may be used as a light source of a backlight unit (BLU) by configuring an LED package.

Since the backlight unit as described above provides a surface light source to the liquid crystal panel, it may be viewed as an example of an apparatus for planar lighting. Such a planar lighting apparatus, which is capable of uniformly emitting light through a flat surface, usually represent a relatively thin light source.

Given the planar lighting apparatus as above, it may be possible to increase the lighting efficiency of a display and manufacture a slim display.

SUMMARY OF THE INVENTION

Accordingly, the present invention is directed to an apparatus for planar lighting that substantially obviates one or more problems due to limitations and disadvantages of the related art.

An object of the present invention is to provide an apparatus for planar lighting with a light guide layer which may provide a support structure to maintain a constant height of the light guide layer.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for planar lighting includes a plurality of light sources arranged on a circuit board; a reflective layer disposed on the circuit board; a transmission regulation layer disposed on the reflective layer and provided with a hole pattern allowing light to be transmitted therethrough, wherein a size of the hole disposed proximate to the light source is smaller than a size of the hole disposed between adjacent two light sources; a spacer disposed between the reflective layer and the transmission regulation layer such that the spacer maintains a distance between the reflective layer and the transmission regulation layer, wherein the spacer comprises at least one protrusion formed by bending a plate member; and an optical sheet disposed on the transmission regulation layer.

In another aspect of the present invention, there is provided an apparatus for planar lighting including a plurality of light sources arranged on a circuit board; a reflective layer disposed on the circuit board; a transmission regulation layer disposed on the reflective layer and provided with a hole pattern allowing light to be transmitted therethrough, wherein a size of the hole disposed proximate to the light source is smaller than a size of the hole disposed between adjacent two light sources; a spacer disposed between the reflective layer and the transmission regulation layer to form a light guide layer, wherein the spacer maintains a distance between the reflective layer and the transmission regulation layer, and wherein the spacer is provided with at least one protrusion connected through an extension portion; and an optical sheet disposed on the transmission regulation layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention. Wherever possible, the same reference numbers will be used throughout the drawings to refer to the same or like parts.

Various modifications and variations are possible in the present invention, and a few specific embodiments are exemplarily shown in the accompanying drawings and described in detail below. However, these are not intended to limit the scope of the present invention. Various equivalents and modifications may be made without departing from the spirit of the invention, which is defined in the claims.

As used herein, the term "on" in the context of a layer, region, or substrate disposed on another constituent means that the layer, region, or substrate is disposed directly on another constituent or indirectly on another constituent with an element interposed.

In the disclosure below, the terms "first" and "second" may be used to describe various elements, components, regions, layers, and/or areas. It should be understood that the elements, components, regions, layers, and/or areas are not limited by these terms.

Figure 1:
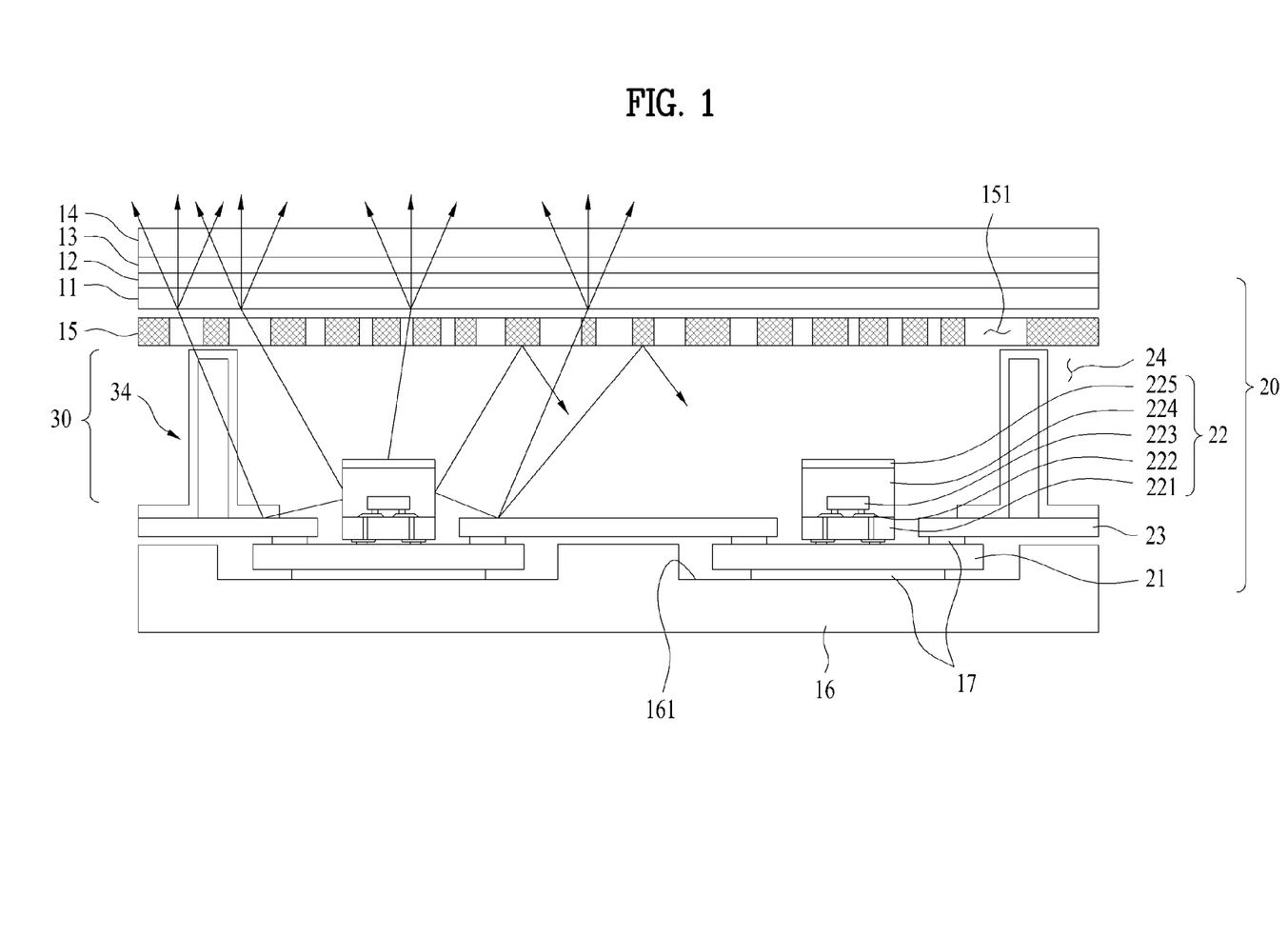
FIG. 1 is a cross-sectional view illustrating an apparatus for planar lighting according to an embodiment.

FIG. 1 is a cross-sectional view illustrating an apparatus for planar lighting according to an embodiment.

A planar lighting apparatus 20 may be disposed on a lower cover 16, and a liquid crystal panel (not shown) may be disposed on the planar lighting apparatus 20.

The planar lighting apparatus 20 includes a plurality of light sources 22 mounted on a circuit board 21 disposed at the upper side of the lower cover 16. The light sources 22 may be mounted on the circuit board 21 in a manner that a light emitting diode (LED) package is surface-mounted on the circuit board 21.

In such a light source 22 including the LED package, a pair of electrodes 222 may be arranged through a sub-mount substrate 221, an LED 223 is connected and mounted to the electrodes 222, and a fluorescent layer 224 having a mixed silicone resin may be disposed at the outer side of the LED 223.

In addition, the upper surface of the fluorescent layer 224 may be flat, and an optical layer 225 having an optical property of reflection or transmission may be disposed on the upper surface of the fluorescent layer 224.

The optical layer 225 may be formed of a material manufactured by mixing phenylpropanolamine (PPA), epoxy molding compound (EMC), micro cell polyethylene terephthalate (MCPET), silver (Ag), and aluminum (Al) having a high reflectivity with a bead having physical properties of reflection, transmission or refraction such as titanium (Ti), aluminum (Al), silver (Ag) and silicon dioxide ($SiO_2$) and a resin.

The light emitted upward from the LED 223 by the optical layer 225 may be reflected toward the side of the fluorescent layer 234. Herein, the LED 223 may be a blue LED, and the fluorescent substance constituting the fluorescent layer 234 may be a yellow phosphor. Thereby, white light may be emitted from the light source 22.

The light source 22 installed on the circuit board 21 may be disposed in a seating groove 161 provided on the upper surface of the lower cover 16. In addition, the seating grooves 161 may be arranged spaced a certain distance from each other, and thereby the circuit boards 21 disposed on the seating grooves 161 may also be arranged spaced a certain distance from each other. Accordingly, the light sources 22 may be arranged spaced a certain distance from each other on the lower cover 16.

Such light sources 22 may be arranged in a line, or in a zigzag pattern.

At this time, a reflective layer 23 may be disposed in the space between the light sources 22 on the circuit board. Thereby, the light sources 22 may protrude above the reflective layer 23.

In addition, a transmission regulation layer 15 provided with a pattern of holes 151 arranged a certain distance from the reflective layer 23 and allowing light to be transmitted therethrough may be disposed on the reflective layer 23.

The transmission regulation layer 15 may be a reflective sheet which causes a part of light emitted by the light sources 22 to be transmitted therethrough and reflects the remainder thereof.

The transmission regulation layer 15 may be implemented by a hole patterned reflective sheet having a plurality of holes 151. That is, light emitted from the light sources 22 or reflected from the reflective layer 23 may be transmitted through the holes 151, and the light incident on the other regions may be reflected back to the reflective layer 23 or refracted or reflected by a spacer 30.

The radius of the holes 151 may increase as the distance from the center of the light source 22 increases such that transmissivity of light becomes greater than the reflectivity of light as the distance from the light source 22 increases.

That is, the size of the hole 151 disposed between adjacent two light sources 22 is greater than the other holes 151.

In addition, the size of the holes 151 increases with a distance from a position on a light source toward a position between adjacent two light sources. And then, the size of the holes 151 decreases as a distance from the position between adjacent two light sources increases.

The light intensity increases when the distance from the light source 22 decreases, while the light intensity decreases when the distance increases. Accordingly, to maintain uniform luminance throughout the entire display panel employing the planar lighting apparatus, the amount of transmitted light may need to be increased as the distance from the light source 22 increases.

In this way, the light emitted from the light source through the space between the reflective layer 23 and the transmission regulation layer 15 diffuses in a lateral direction. The light diffusing in this manner is emitted upward through the pattern of holes 151. The space arranged between the reflective layer 23 and the transmission regulation layer 15 to allow light to diffuse therethrough may be defined as a light guide layer 24.

The light guide layer 24 may be formed by a spacer 30 disposed between the reflective layer 23 and the transmission regulation layer 15 to maintain a certain distance between the reflective layer 23 and the transmission regulation layer 15.

That is, the spacer 30 may function to maintain a constant distance between the transmission regulation layer 15 and the light source 22, and may extend to a height corresponding to the height as designed and a length corresponding to the length of the reflective layer 23.

The spacer 30 may be formed of polycarbonate (PC), polymethyl methacrylate (PMMA), glass, resin, phenylpropanolamine (PPA), or aluminum (Al) so as to transmit, refract, or reflect light.

Accordingly, in addition to the mechanical property of maintaining the distance between the reflective layer 23 and the transmission regulation layer 15, the spacer 30 may cause interfacial reflection of the light emitted from the light source 22. About 20% to 50% of the emitted light may diffuse through interfacial reflection.

The spacer 30 includes a protrusion 34 protruding from the reflective layer 23 by being bent toward the transmission regulation layer 15. The spacer 30 including the protrusion 34 formed in a bent fashion may minimize the deviation of heights of the protrusions 34 and secure a certain size of the light guide layer 24.

In addition, optical sheets such as a diffusion layer 11, a lower polarizing plate 12, a color filter board, and an upper polarizing plate may be disposed on the transmission regulation layer 15.

Meanwhile, an adhesive 17 may be applied to the bottom surfaces of the circuit board 21 and the reflective layer 23.

Thereby, the circuit board 21 may be fixed to the seating groove 161 of the lower cover 16, and the reflective layer 23 may be fixed to the circuit board 21.

Figure 2:
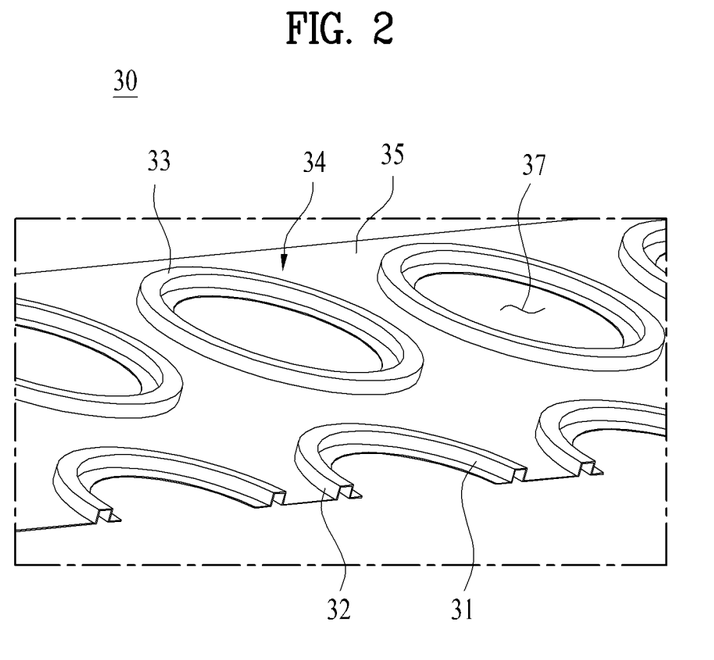
FIG. 2 is a perspective view illustrating an example of a spacer.

As shown in FIG. 2, the spacer 30 may be provided with the protrusion 34 by bending a film having a relatively constant thickness. A plurality of such protrusions 34 may be arranged along the periphery of the light source 22. In this case, the thickness of the film constituting the spacer 30 may vary depending upon position.

The thickness of the film constituting the spacer 30 may be between 50 μm and 500 μm.

Figure 3:
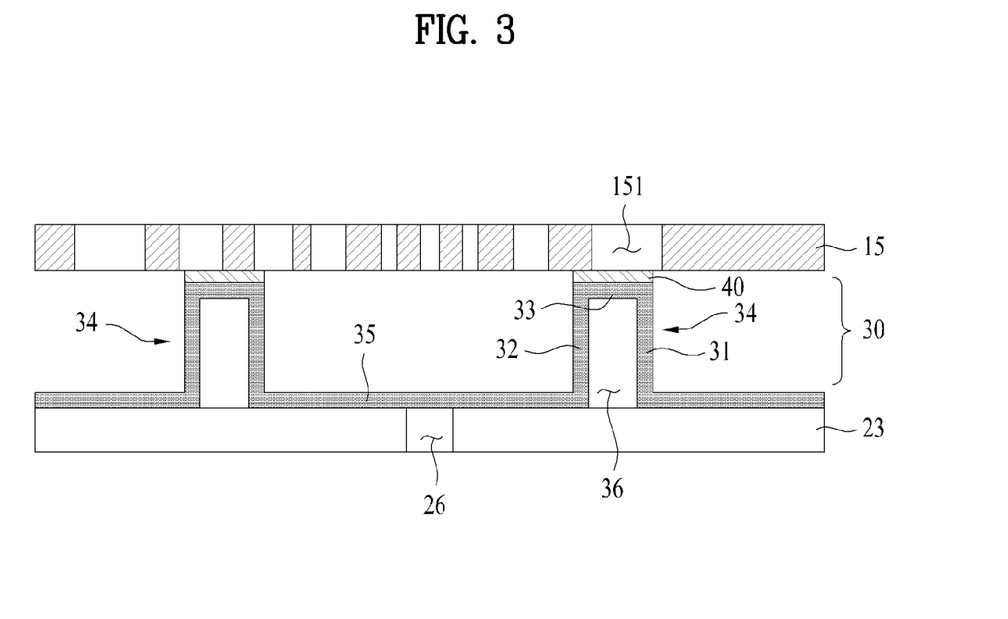
FIGS. 3 to 5 are cross-sectional views schematically illustrating various examples of the spacer.

As shown in FIGS. 2 and 3, the protrusion 34 of the spacer 30 is formed by being bent from an extension portion 35 close to the reflective layer 23 toward the transmission regulation layer 15.

Accordingly, the protrusion 34 is provided with a first wall 31 and a second wall 32 substantially perpendicularly disposed between the reflective layer 23 and the transmission regulation layer 15, and a third wall 33 arranged between the first and second walls to be close to the transmission regulation layer 15. That is, the third wall 33 forms the top of the protrusion 34.

By such bent walls 31, 32 and 33, a space 36 is defined therein. The height of the space 36 approximates to the height of the spacer 30 forming the light guide layer 24.

The spacer 30 may be attached to the transmission regulation layer 15 by applying an adhesive 40 to the space between the third wall 33 forming the upper surface of the spacer 30 and the transmission regulation layer 15. At this time, an ultraviolet curing process or a thermal curing process may be used In addition, the extension portion 35 forming the lower surface of the spacer 30 and the reflective layer 23 may also be attached to each other by applying the adhesive 40 therebetween.

As the protrusion 34 is bent to form a concave-convex structure, a three-dimensional structure may be formed.

As shown in FIG. 2, the protrusion 34 may be formed in a ring shape along the periphery of the light source 22. Accordingly, the number of the protrusions 34 may be equal to or greater than the number of the light source 22. That is, a plurality of ring-shaped protrusions 34 may be regularly arranged. Alternatively, the protrusions 34 may be formed in various shapes such as a straight bar, a bent bar, a circular column, and a cone.

As shown in FIG. 2, when the protrusions 34 are disposed along the periphery of each light source 22, the protrusions 34 may be connected to each other by the extension portion 35.

In FIG. 3, the extension portion 35 covers a mount hole 26 in which the light source 22 is installed. Alternatively, an open hole 37 may be provided to the extension portion 35 such that the light source 22 is disposed through the open hole 37, as shown in FIG. 2.

Figure 4:
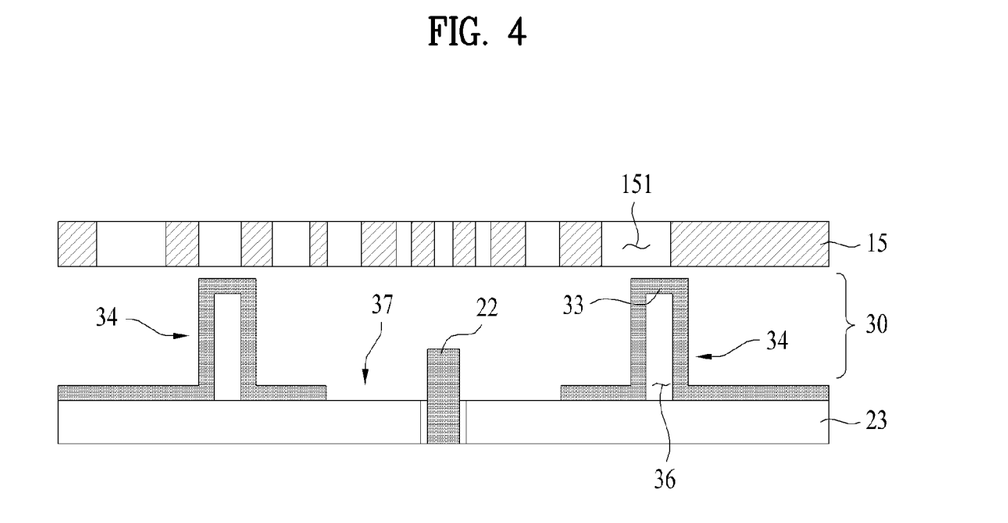

Referring to FIG. 4, the light source 22 is arranged to protrude from the mount hole 26 (see FIG. 3) formed in the reflective layer 23. Herein, the light source 22 may be arranged at a position corresponding to the position of the open hole 37 of the spacer 30. Other details are the same as those described above with reference to FIGS. 2 and 3.

Figure 5:
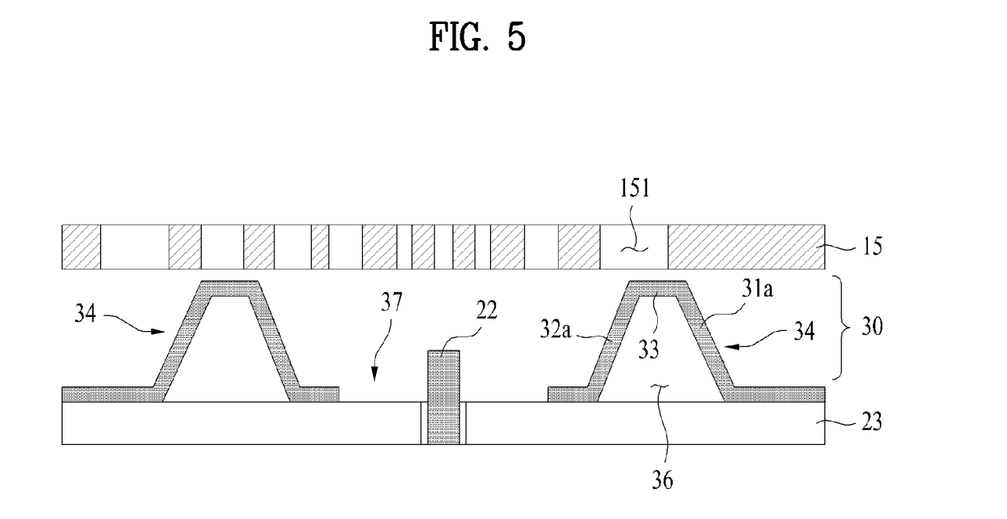

Meanwhile, the sidewall of the protrusion 34 may be inclined as shown in FIG. 5. That is, the cross section of the protrusion 34 may be provided with a first wall 31a and a second wall 32a which are inclined in the opposite directions.

In some cases, the sidewalls 31a and 32a of the protrusion 34 may increase the efficiency of diffusion of light from the light source 22 in the lateral direction.

Other details are the same as those described above with reference to FIGS. 2 and 3.

Figure 6:
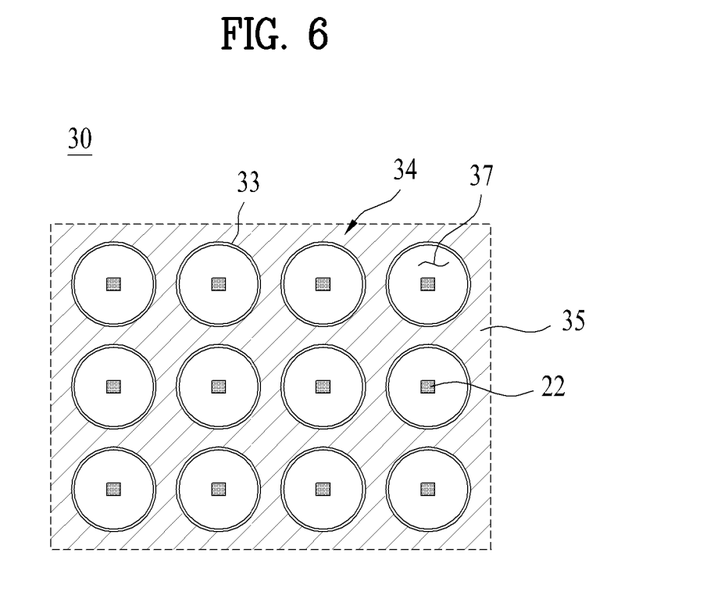
FIGS. 6 to 10 are plan views schematically illustrating various examples of an arrangement of light sources and a spacer.

FIG. 6 is a plan view illustrating an example of an embodiment exemplarily shown in FIGS. 2 and 3.

As shown in FIG. 6, the spacer 30 is provided with a plurality of protrusions 34 arranged at positions corresponding to the positions of the light sources 22.

That is, FIG. 6 shows the light sources 22 arranged in a square fashion, and the protrusions 34 arranged at positions corresponding to the positions of the light sources 22. The third wall 33 forming the top surface of the protrusion 34 may substantially support the upper structure (for example, the transmission regulation layer 15).

The open hole 37 may be disposed between each of the protrusions 34 and the corresponding light source 22, and the protrusions 34 may be connected to each other by the extension portion 35.

Figure 7:
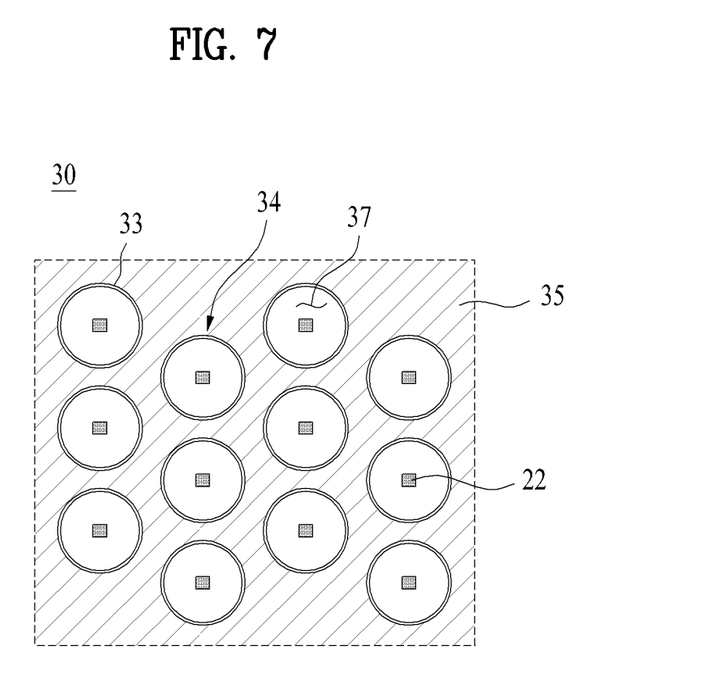

Referring to FIG. 7, the light sources 22 are arranged in a zigzag pattern, i.e., in a triangular shape, the protrusions 34 of the spacer 30 are arranged at positions corresponding to the light sources 22.

Figure 8:
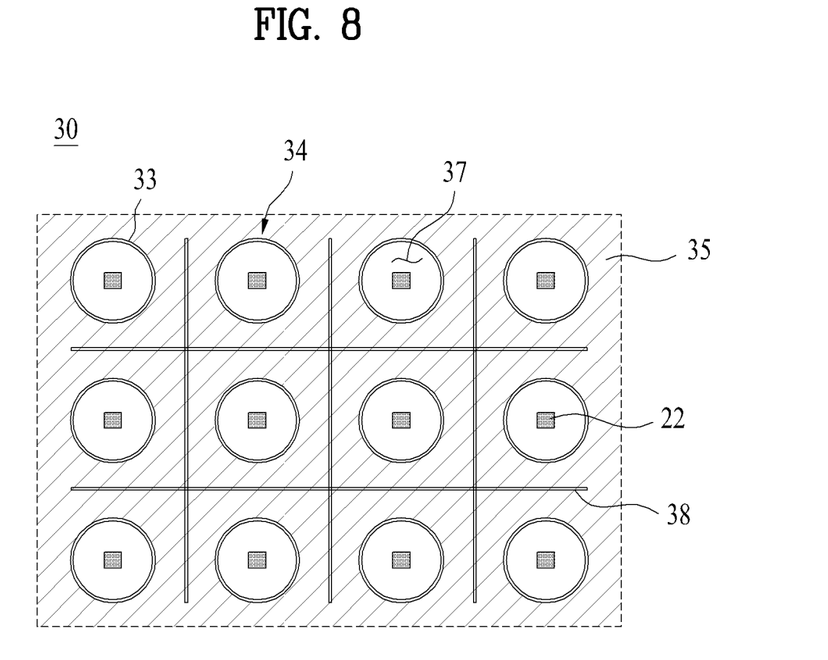

Meanwhile, as shown in FIG. 8, auxiliary protrusions 38 may be further provided between the protrusions in addition to the configuration shown in FIG. 6.

As shown in FIG. 8, the auxiliary protrusions 38 may be arranged in a mesh structure or a checkerboard pattern, or various other patterns.

Figure 9:
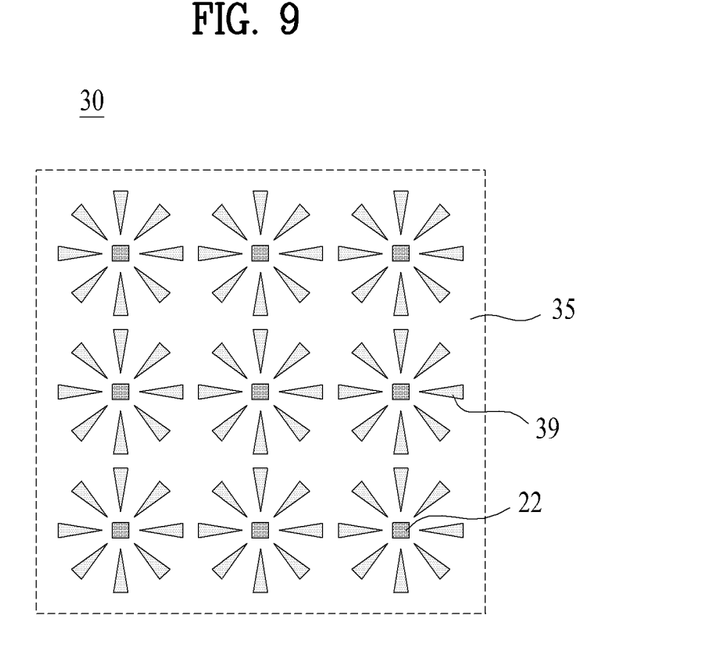

In addition, as shown in FIG. 9, protrusions 39 radially disposed with respect to each light source 22 may be provided. That is, a plurality of protrusions 39 arranged about the light source 22, spaced a certain distance (or a certain angle) from each other, and extending in a radial direction may be provided. The protrusions 39 may be connected to each other by the extension portion 35.

As the spacer 30 includes the protrusions 39 radially disposed with respect to the light source 22, interference between the light emitted from the light source 22 and the spacer 30 may be minimized.

Figure 10:
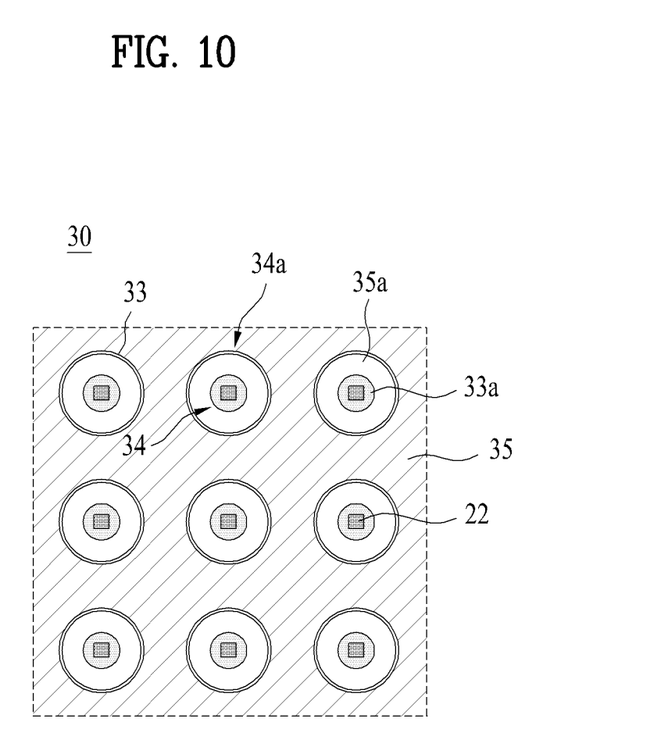
Figure 11:
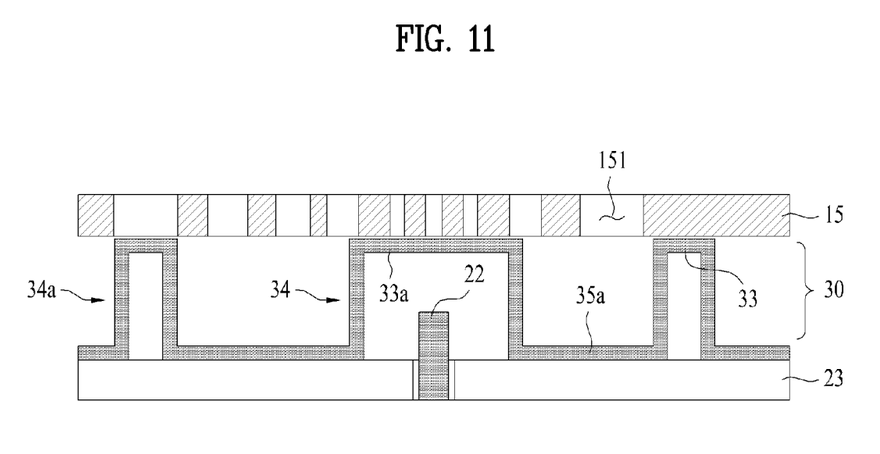
FIGS. 11 to 14 are cross-sectional views schematically illustrating various examples of a spacer including a protrusion to cover the light source.
Figure 12:
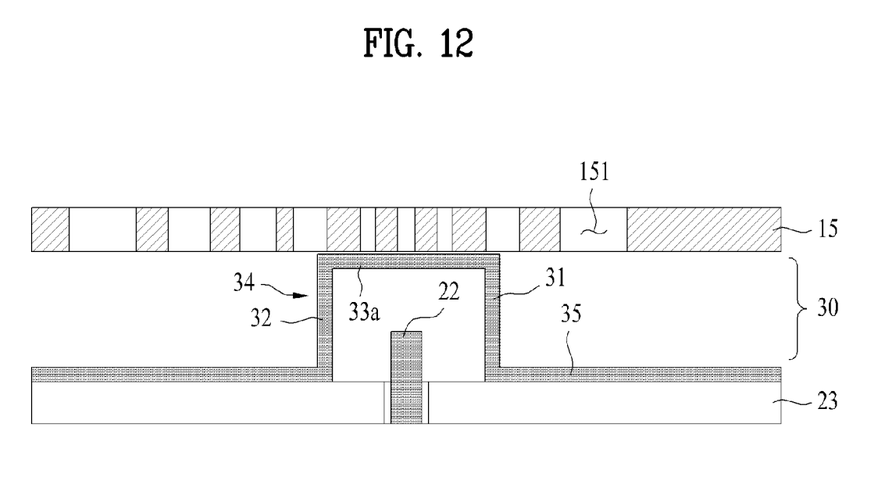

FIGS. 10 to 12 show a configuration having protrusion 34 covering the light source 22. Each of the protrusions 34 includes a third wall 33a disposed on the corresponding light source 22. The third walls 33a may support the transmission regulation layer 15.

As the spacer 30 is provided with such protrusions 34, reflection of the light emitted from the light source 22 may be improved through specular reflection from the spacer 30, leading to increase of the overall efficiency of the planar lighting apparatus.

That is, the spacer 30 configured as above may improve not only mechanical stability in supporting the transmission regulation layer 15 but also optical properties.

In addition, a second protrusion 34a may be disposed around the protrusion 34 (hereinafter, a first protrusion) covering the light source 22. The description given above with reference to FIGS. 2 and 3 is directly applicable to the second protrusion 34a. That is, the second protrusion 34a may be disposed around the light source 22 in a ring shape.

Figure 13:
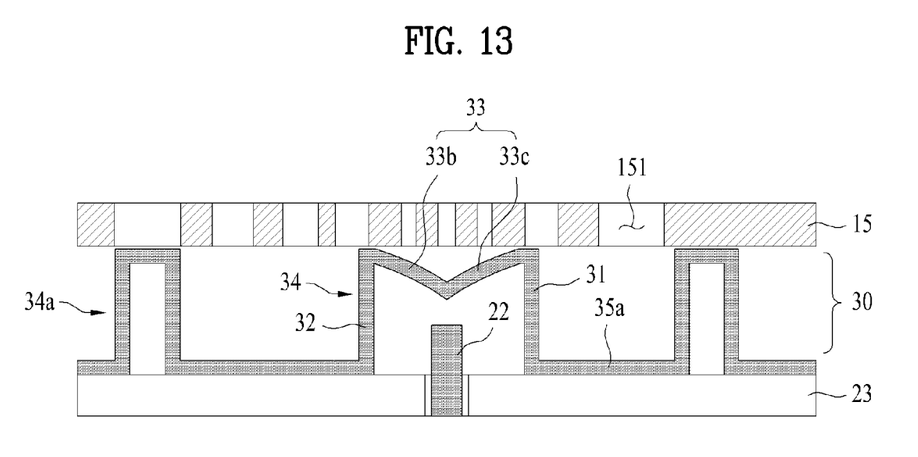

As shown in FIG. 13, the third wall 33 of the first protrusion 34 covering the light source 22 may include curved portions 33b and 33c formed in a lens shape.

That is, the third wall 33 extending from the first wall 31 and the second wall 32 may be provided with curved portions 33b and 33c extending toward the light source 22.

The curved portions 33b and 33c may allow the light emitted upward from the light source 22 to be more efficiently diffused.

Accordingly, the first protrusion 34 may support the transmission regulation layer 15 and maximize the optical property of diffusion.

Figure 14:
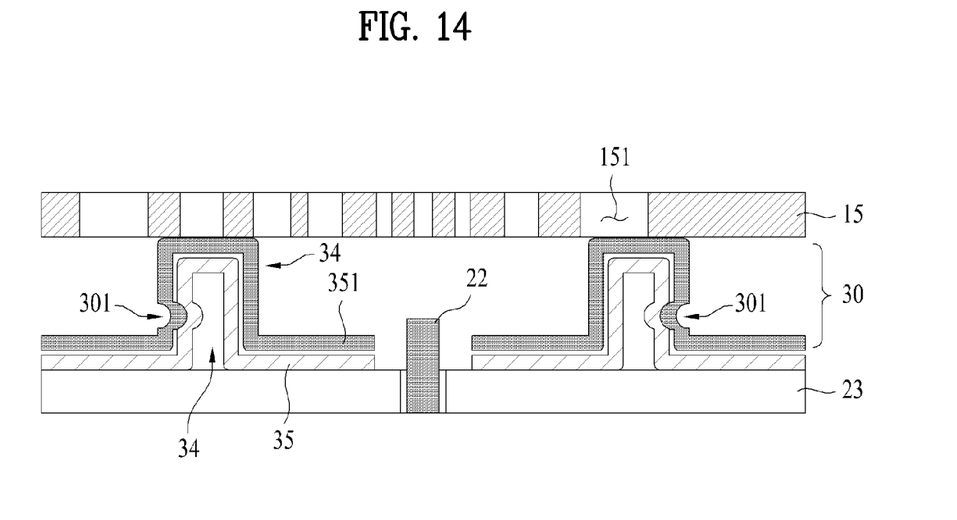

Meanwhile, as shown in FIG. 14, the second protrusion 34b disposed at the periphery of the light source 22 may be arranged to penetrate the transmission regulation layer 15 and support the optical sheets 11, 12, 13 and 14.

That is, the first protrusion 34 covering the light source 22 supports the transmission regulation layer 15, and the second protrusion 34b supports the optical sheets 11, 12, 13 and 14 by penetrating the transmission regulation layer 15.

By the second protrusion 34b, an air gap may be formed between the transmission regulation layer 15 and the optical sheets 11, 12, 13 and 14. A light diffusion gap 40 allowing light to diffuse therethrough may be defined by the air gap.

Figure 15:
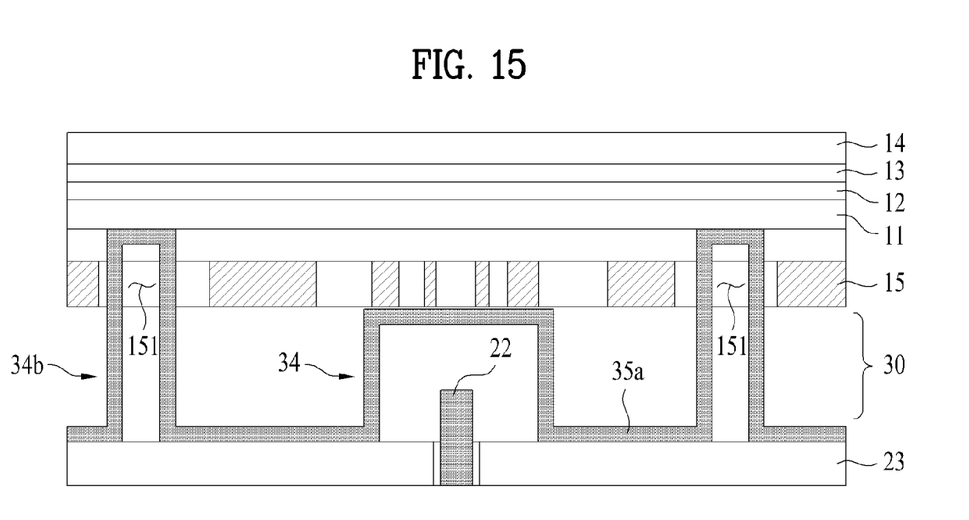
FIG. 15 is a cross-sectional view illustrating another example of a spacer.

FIG. 15 shows an example of the spacer 30 configured by combining protrusions 34 and 341 forming two layers.

That is, the film including the lower side of the protrusion 34 may allow the extension portion 35 to support the reflective layer 23, and the film including the upper side of the protrusion 341 may allow the upper surface of the protrusion 341 to support the transmission regulation layer 15. The two protrusions 34 and 341 may be combined with each other.

For example, the two protrusions 34 and 341 may be combined with each other by a projection and a groove 301. For example, a groove may be provided to the lower side of the protrusion 34, and the upper side of the protrusion 341 may be provided with a projection to be coupled to the groove such that the two protrusions 34 and 341 are combined with each other.

For other details, the description given above is applicable. That is, various embodiments have been described above and a description of one embodiment may be applied to another embodiment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for planar lighting comprising:
a plurality of light sources arranged on a circuit board;
a reflective layer disposed on the circuit board;
a transmission regulation layer disposed on the reflective layer and provided with a hole pattern allowing light to be transmitted therethrough, wherein a size of the hole disposed proximate to the light source is smaller than a size of the hole disposed between adjacent two light sources;
a spacer disposed between the reflective layer and the transmission regulation layer such that the spacer maintains a distance between the reflective layer and the transmission regulation layer, wherein the spacer comprises at least one protrusion formed by bending a plate member; and
an optical sheet disposed on the transmission regulation layer.

2. The apparatus according to claim 1, wherein the plate member has substantially a constant thickness.

3. The apparatus according to claim 1, further comprising an auxiliary protrusion disposed between the protrusions.

4. The apparatus according to claim 1, further comprising an extension portion to connect the protrusions to each other.

5. The apparatus according to claim 4, wherein the extension portion is attached to the reflective layer, and wherein the protrusions are attached to the transmission regulation layer.

6. The apparatus according to claim 1, wherein the size of the hole disposed between adjacent two light sources is greater than the other holes.

7. The apparatus according to claim 1, wherein a size of the holes increases with a distance from a position on a light source toward a position between adjacent two light sources.

8. The apparatus according to claim 1, wherein the protrusion comprises:
a first protrusion disposed on a corresponding one of the light sources; and
a second protrusion disposed at a periphery of the corresponding one of the light sources.

9. The apparatus according to claim 8, wherein the second protrusion penetrates the transmission regulation layer.

10. The apparatus according to claim 9, wherein the second protrusion contacts the optical sheet to form a light diffusion gap.

11. The apparatus according to claim 7, wherein the protrusion disposed on the corresponding one of the light sources is provided with a curved portion formed in a lens shape.

12. The apparatus according to claim 1, wherein the spacer comprises:
a first layer attached to the reflective layer; and
a second layer coupled to the first layer and attached to the transmission regulation layer.

13. The apparatus for planar lighting according to claim 12, wherein the first layer and the second layer are coupled to each other by a projection and a groove.

14. The apparatus according to claim 1, wherein the protrusion is inclined with respect to the reflective layer or the transmission regulation layer.

15. The apparatus according to claim 1, wherein the protrusion is arranged around an open hole where the light source is located.

16. An apparatus for planar lighting comprising:
a plurality of light sources arranged on a circuit board;
a reflective layer disposed on the circuit board;
a transmission regulation layer disposed on the reflective layer and provided with a hole pattern allowing light to be transmitted therethrough, wherein a size of the hole disposed proximate to the light source is smaller than a size of the hole disposed between adjacent two light sources;
a spacer disposed between the reflective layer and the transmission regulation layer to form a light guide layer, wherein the spacer maintains a distance between the reflective layer and the transmission regulation layer, and wherein the spacer is provided with at least one protrusion connected through an extension portion; and
an optical sheet disposed on the transmission regulation layer.

17. The apparatus according to claim 16, wherein the protrusion of the spacer is formed by bending a plate member having a constant thickness.

18. The apparatus according to claim 17, wherein the thickness of the plate member is less than a height of the protrusion.

19. The apparatus according to claim 16, wherein the protrusion is disposed to cover a corresponding one of the light sources.

20. The apparatus for planar lighting according to claim 19, wherein the protrusion to cover the corresponding one of the light sources is provided with a curved portion having a lens shape.

* * * * *